United States Patent
Weinert et al.

(10) Patent No.: US 7,162,135 B2
(45) Date of Patent: *Jan. 9, 2007

(54) FIBER DISTRIBUTION FRAME

(75) Inventors: Stephen J. Weinert, Arlington, TX (US); Michael L. Yeilding, Fremont, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/265,928

(22) Filed: Nov. 3, 2005

(65) Prior Publication Data

US 2006/0056787 A1  Mar. 16, 2006

Related U.S. Application Data

(63) Continuation of application No. 10/910,412, filed on Aug. 3, 2004, now Pat. No. 6,990,284.

(51) Int. Cl.
*G02B 6/00* (2006.01)

(52) U.S. Cl. .................. 385/135; 385/134; 385/147

(58) Field of Classification Search ........ 385/130–136, 385/147; 70/14, 30, 49, 53–55, 93, 417; 174/59; 16/2.1, 2.2
See application file for complete search history.

(56) References Cited

U.S. PATENT DOCUMENTS

| | | | |
|---|---|---|---|
| 1,802,735 A * | 4/1931 | Pudelko .................... 220/323 |
| 5,119,459 A | 6/1992 | Meyerhoefer et al. |
| 5,274,731 A | 12/1993 | White |
| 5,790,738 A | 8/1998 | Parzygnat |
| 5,823,646 A | 10/1998 | Arizpe et al. |
| 6,170,928 B1 | 1/2001 | Eardley et al. |
| 6,760,531 B1 * | 7/2004 | Solheid et al. .............. 385/135 |
| 6,920,274 B1 * | 7/2005 | Rapp et al. ................. 385/135 |
| 6,990,284 B1 * | 1/2006 | Weinert et al. ............. 385/135 |
| 2004/0146266 A1 | 7/2004 | Solheid et al. |
| 2005/0100301 A1 | 5/2005 | Solheid et al. |
| 2005/0135768 A1 | 6/2005 | Rapp et al. |
| 2005/0232566 A1 | 10/2005 | Rapp et al. |

* cited by examiner

*Primary Examiner*—Hemang Sanghavi
(74) *Attorney, Agent, or Firm*—Brooks Kushman P.C.

(57) ABSTRACT

A fiber distribution frame includes an enclosure having an exposed face. A door is connected to the enclosure for opening and closing with respect to the exposed face. A post is connected to the enclosure, a strap is connected at a first end to the post, and a latch is connected to the door. The latch has a receptacle for receiving a fastener, and a a conduit for receiving the strap. The receptacle and the conduit adjoin one another such that, when the door is closed and a second end of the strap is inserted through the conduit, a fastener fastened into the receptacle holds the strap in the conduit in order to connect the latch to the post and thereby lock the door closed. A diffuser component is attachable to the door for absorbing radiation from fiber optic components disposed within the enclosure when the door is closed.

18 Claims, 2 Drawing Sheets

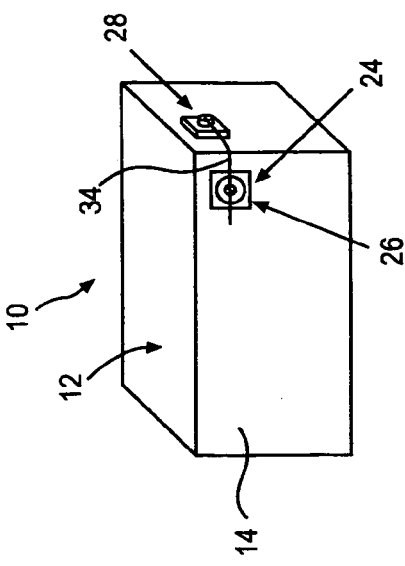
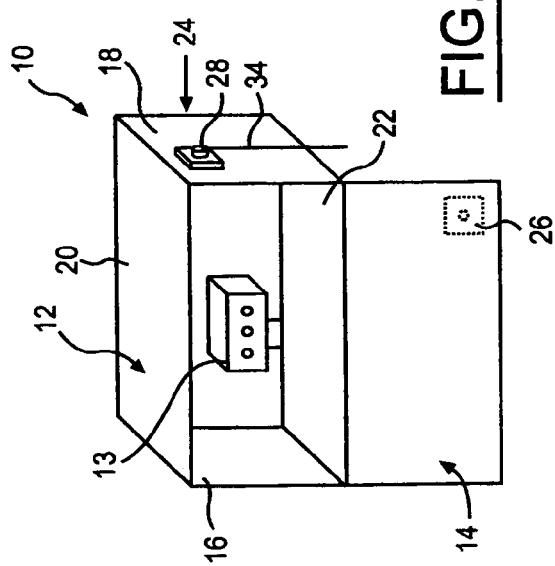
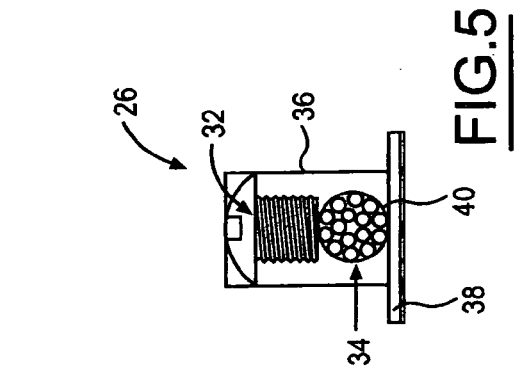
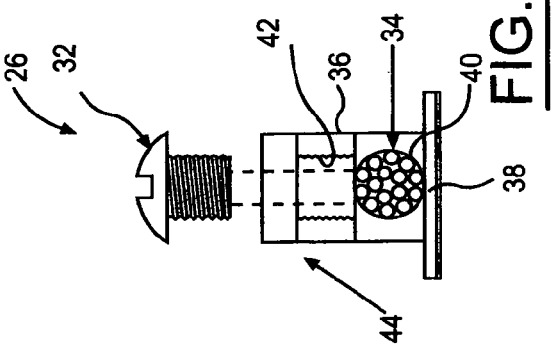
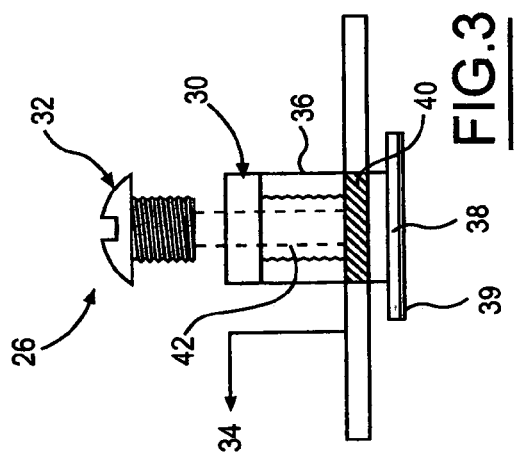

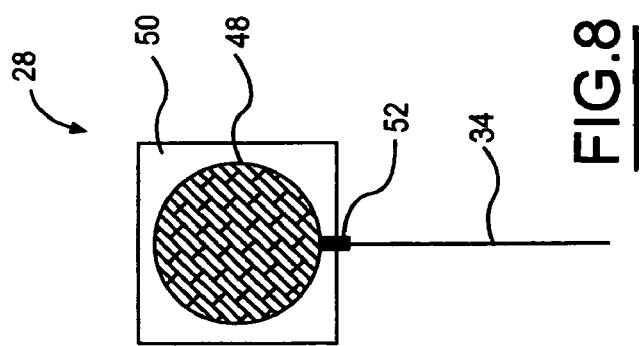
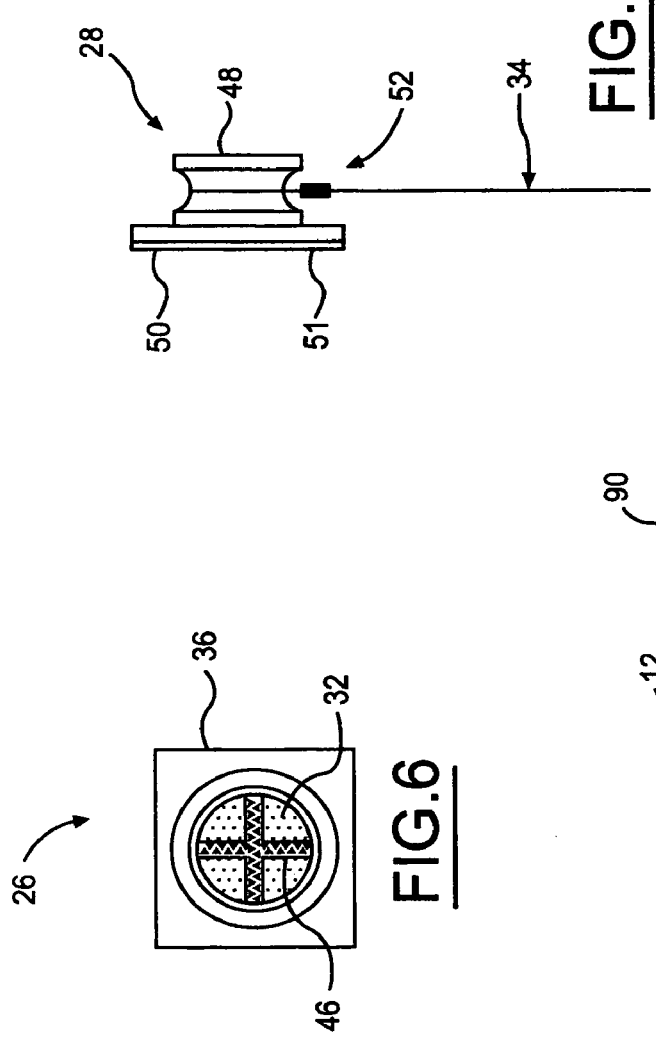
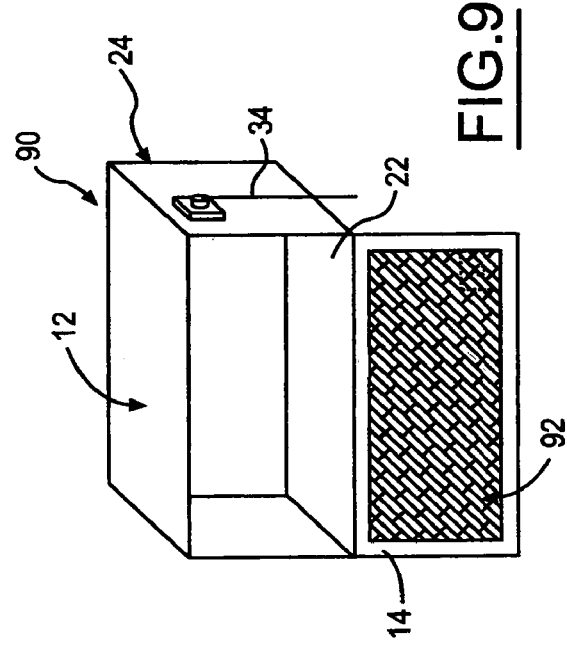

FIBER DISTRIBUTION FRAME

CROSS-REFERENCE TO RELATED APPLICATIONS

This application is a continuation of U.S. application Ser. No. 10/910,412, filed Aug. 3, 2004, now U.S. Pat. No. 6,990,284.

BACKGROUND OF THE INVENTION

1. Field of the Invention

The present invention generally relates to fiber distribution frames.

2. Background Art

A fiber distribution frame serves as an interface between outside plant fiber optic facilities entering a central office structure and fiber optic equipment installed within that same location. A fiber distribution frame provides a centralized point for the organization and administration of the fiber optic facility and intra-building fiber equipment cables; provides a flexible platform for future fiber growth; and provides re-configurable connections between any two terminations or appearances.

In its most basic form, a fiber distribution frame is a housing, cabinet, enclosure, etc., which houses fiber optic components. Fiber optic components include fiber optic cables, jumpers, strands, connectors, etc. In general, fiber optic components extend into and out of a fiber distribution frame. A fiber distribution frame typically has optical fiber panels arranged near the front-side of the frame for enabling incoming and exiting fiber optic components to be selectively cross-connected together.

A fiber distribution frame includes a door which is connected by a hinge to the front-side and/or the rear-side of the frame. The door opens and closes shut in order to provide and limit access of human personnel to the panels and the fiber optic components housed within the fiber distribution frame. When shut, the door shields the panels and the fiber optic components from the outside environment and from inadvertent or unauthorized access by human personnel.

It is desirable to limit access by human personnel to fiber distribution frames, especially when high power optical transmission sources are being routed through the frames. This is so because a fiber distribution frame is essentially a deployment of optically amplified networks. As the amplification factor of the optical signals communicated by the fiber optic components deployed within the serving central office increases, so increases the potential for inadvertent exposure by human personnel to optical radiation. The fiber distribution frame is the termination and cross-connection point for both optical laser transmission equipment and cables routed to other equipment and locations.

Accordingly, it is desirable to maintain the door of a fiber distribution frame in a locked shut configuration in order to restrict inadvertent or unauthorized access to the fiber distribution frame. Maintaining the door of a fiber distribution frame in a locked shut configuration secures human personnel from inadvertent or unauthorized access to the fiber distribution frame.

Further, optical radiation may leak, reflect, or be routed through the doors of certain fiber distribution frames even when these doors are in a locked shut configuration. Accordingly, it is further desirable to prevent optical radiation from escaping through the doors in order to protect human personnel from inadvertent or undesired exposure to the optical radiation.

BRIEF DESCRIPTION OF THE DRAWINGS

FIG. 1 illustrates a perspective view of a fiber distribution frame in accordance with the present invention in which the door of the fiber distribution frame is opened and a door locking device is unlocked;

FIG. 2 illustrates a perspective view of the fiber distribution frame shown in FIG. 1 in which the door locking device locks the door closed;

FIG. 3 illustrates a side view of a door latch of the door locking device;

FIG. 4 illustrates another side view of the door latch of the door locking device with this side view being rotated 90° with respect to the side view shown in FIG. 3;

FIG. 5 illustrates a side view of the door latch of the door locking device in which the door latch is locked;

FIG. 6 illustrates a top view of the door latch of the door locking device;

FIG. 7 illustrates a side view of a strapping post of the door locking device;

FIG. 8 illustrates a top view of the strapping post of the door locking device; and FIG. 9 illustrates a perspective view of a fiber distribution frame in accordance with another embodiment of the present invention in which a light diffuser component material is attached to the inner surface of the door of the fiber distribution frame.

DETAILED DESCRIPTION OF THE PREFERRED EMBODIMENT(S)

The advantages of the fiber distribution frame in accordance with the present invention are numerous. For example, the fiber distribution frame includes a secure door locking device for locking the door of the fiber distribution frame. The door locking device includes a door latch and a strapping post. The door latch is attachable to the door of the fiber distribution frame and the strapping post is attachable to a side surface of the fiber distribution frame. The door latch and the strapping post function with one another to lock and unlock the door of the fiber distribution frame in which connector terminations are present. The door latch and the strapping post are mountable to the doors and side surfaces of any existing or new fiber distribution frames.

The door locking device requires human personnel to use a tool such as a screwdriver in order to unlock the door latch from the strapping post. As such, the equipment is established such that human intervention does not permit the opening of the door locking device without a tool. Upon unlocking the door locking device by unlocking the door latch from the strapping post, the human personnel are able to unlock and open the door of the fiber distribution frame. Upon opening the door, the human personnel gain access to the optical fiber panels and the fiber optic components present in the fiber distribution frame. As such, when locked, the door locking device prevents human personnel from casually opening the door and gaining inadvertent or unauthorized access to the contents of the fiber distribution frame. That is, the door locking device requires human personnel to have a purpose for opening the door of the fiber distribution frame as a tool is required to be used by the human personnel in order to unlock the door locking device. As a result, the door locking device prevents the occurrence of unauthorized human personnel from simply passing by the fiber distribution frame and deciding to open its door.

The fiber distribution frame in accordance with another embodiment of the present invention provides an optical radiation diffusing or absorbing function in order to prevent optical radiation from leaking or escaping through the door of the fiber distribution frame. The optical radiation diffusing function is provided by a diffuser component material which is adhered to the door (and/or the side surfaces) of the fiber distribution frame. The diffuser component takes high-powered optical radiation emitted from fiber optic components present within the fiber distribution frame and either terminates this radiation or diffuses this radiation over a larger footprint in order to reduce the hazard level of the radiation. As such, the diffuser component augments and improves the optical containment capabilities of the door and the sides of the fiber distribution frame when high-powered fiber optic components such as lasers and LEDs are placed into service within the fiber distribution frame.

The door locking device and the diffuser component in accordance with the present invention are both placeable on existing doors and side surfaces of fiber distribution frames. As such, the door locking device and the diffuser component are both easily installable on the doors of "legacy" fiber distribution frames for retrofit and on the doors of "future" fiber distribution frames.

Accordingly, the door locking device in accordance with the present invention provides an optical security feature to a fiber distribution frame. Likewise, the diffuser component in accordance with the present invention provides an optical protection feature to a fiber distribution frame.

Referring now to FIG. 1, a perspective view of a fiber distribution frame 10 in accordance with the present invention is shown. Fiber distribution frame 10 includes a housing 12 and a door 14. Housing 12 has left and right side surfaces 16 and 18 and top and bottom side surfaces 20 and 22 and a rear surface (not numbered). The surfaces of housing 12 form the outlining segments of an enclosure, compartment, cabinet, chassis, etc., for housing fiber optic components 13 therein. Such fiber optic components include fiber optic cables, fibers, jumpers, connectors, terminations, and fiber optic panels, etc. Fiber optic panels are used to selectively connect the fiber optic components to one another. Typically, fiber optic panels extend across the front side of the enclosure between side surfaces 16 and 18 of housing 12. The enclosure formed by the side surfaces of housing 12 has an exposed front face.

Door 14 is connected by hinges or the like to bottom surface 22 of housing 12. Door 14 opens and closes with respect to the exposed front face of housing 12. Door 14 is shown in FIG. 1 as being opened. As such, door 14 as shown in FIG. 1 exposes the front face of housing 12 to the outside environment and thereby enables human personnel to access fiber optic components contained therein.

Fiber distribution frame 10 further includes a door locking device 24. Door locking device 24 includes a door latch 26 and a strapping post 28. Door latch 26 is mounted to door 14 and strapping post 28 is mounted to side surface 18 of housing 12. Door latch 26 and strapping post 28 function with one another in order to lock and unlock door 14 with respect to the front face of housing 12.

To this end, a first end of a cable or wire 34 is wrapped around and connected to strapping post 28. Cable or wire 34 could be a fiber optic component such as a fiber optic jumper. A second end of cable 34 connects with door latch 26 in order to connect the door latch to strapping post 28 and thereby lock door locking device 24. When locked, door locking device 24 locks door 14 to housing 12. Likewise, the second end of cable 34 disconnects from door latch 24 in order to disconnect the door latch from strapping post 28 and thereby unlock door locking device 24. When unlocked, door locking device 24 unlocks door 14 from housing 12.

FIG. 1 illustrates door locking device 24 as being unlocked with door latch 26 being disconnected from strapping post 28. In the unlocked configuration of door locking device 24, door 14 is enabled to be opened as shown in FIG. 1.

Referring now to FIG. 2, with continual reference to FIG. 1, a perspective view of fiber distribution frame 10 is shown in which door locking device 24 locks door 14 closed with respect to the front face of housing 12. In the locked configuration of door locking device 24, cable 34 connects door latch 26 to strapping post 28 as shown in FIG. 2. Door 14 is shown in FIG. 2 as being closed and, as a result, secludes housing 12 from the outside environment thereby limiting access of human personnel to fiber optic components contained therein.

Referring now to FIG. 3, with continual reference to FIGS. 1 and 2, a side view of door latch 26 of door locking device 24 is shown. Door latch 26 includes a block 30 made of metal and a fastener element 32. Fastener element 32 is preferably a screw. Block 30 includes a body portion 36 and a support portion 38. Body portion 36 includes a cable conduit 40 running through the body portion. Cable conduit 40 is for receiving the second end of cable 34 as shown in FIG. 3 in order to connect door latch 26 to strapping post 28 and thereby lock door locking device 24. Body portion 36 further includes a receptacle 42 for receiving fastener element 32. The bottom end of receptacle 42 adjoins cable conduit 40 such that fastener element 32 compresses cable 34 when the fastener element is fully inserted into the receptacle and the cable is threaded through the cable conduit (shown in FIG. 5).

Support portion 38 of block 30 includes an adhesive sticker 39 for being attached to the outer surface of door 14. The adhesive sticker is a peel-off sticker which enables human personnel to attach block 30 to the outer surface of door 14 and thereby attach door latch 26 to the door. As a result, door 14 is enabled to be retrofitted with door latch 26 and the door latch is attachable to the doors of new fiber distribution frames.

Referring now to FIG. 4, another side view of door latch 26 of door locking device 24 is shown. The side view of door latch 26 shown in FIG. 4 is rotated 90° with respect to the side view shown in FIG. 3. Body portion 36 of door latch 26 includes a recess 44. Recess 44 meets the head of fastener element 32 when the fastener element is inserted into receptacle 42 and fastened to body portion 36 (shown in FIG. 5).

Referring now to FIG. 5, a side view of door latch 26 of door locking device 24 is shown in which the door latch is locked. Door latch 26 is in the locked configuration as the second end of cable 34 runs through cable conduit 40 and fastener element 32 is inserted into receptacle 42 of body portion 36 such that the fastener element compresses and holds the cable within the cable conduit. As the first end of cable 34 is connected to strapping post 28, the locked door latch 26 locks door 14 to housing 12 (see FIG. 2) as the cable connects the door latch to the strapping post with the middle portion of the cable between the first and second ends abutting the side housing surface 18 and door 14 between strapping post 28 and door latch 26.

In order to unlock door latch 26, human personnel use a tool such as a screwdriver to unscrew fastener element 32 from receptacle 42 of body portion 46 (the fastener element shown in FIGS. 3 and 4 as being removed from the body portion). As such, the second end of cable 34 is not held in cable conduit 40 and is enabled to be removed from the cable conduit by human personnel. Removing the second end of cable 34 from cable conduit 40 effectively disconnects door latch 26 from strapping post 28 thereby unlocking door locking device 24 and allowing door 14 to be opened.

Referring now to FIG. 6, a top view of door latch 26 of door locking device 24 is shown. As shown, the head of fastener element 32 includes a set of grooves 46 for receiving the head of a Phillips screwdriver. Human personnel use such a screwdriver to screw and unscrew fastener element 32 from receptacle 42 of body portion 36. Accordingly, human personnel are required to use a tool such as the screwdriver in order to unlock door latch 26 with the end goal of unlocking door 14. This effectively prevents the casual observer from passing by fiber distribution frame 10 and deciding to open door 14. It is noted that a casual observer is an observer that would not ordinarily have a screwdriver in order to unlock door locking device 24.

Referring now to FIG. 7, a side view of strapping post 28 of door locking device 24 is shown. Strapping post 28 includes a strapping portion 48 and a support portion 50. The first end of cable 34 wraps around and is connected to strapping portion 48. The first end of cable 34 includes a ferrule crimp 52 for securing the first end of the cable to strapping portion 48. Support portion 50 includes an adhesive sticker 51 for being attached to side surface 18 of housing 12. This adhesive sticker is also a peel-off sticker which enables human personnel to attach support portion 50 to side surface 18 of housing 12 and thereby attach strapping post 28 to fiber distribution frame 10. As a result, existing fiber distribution frames are enabled to be retrofitted with strapping post 28 and the strapping post is attachable to the side surfaces of new fiber distribution frames.

Referring now to FIG. 8, a top view of strapping post 28 of door locking device 24 is shown.

Referring now to FIG. 9, a perspective view of a fiber distribution frame 90 in accordance with another embodiment of the present invention is shown. Fiber distribution frame 90 is generally similar to fiber distribution frame 10 and like elements have the same reference numerals. Fiber distribution frame 90 differs from fiber distribution frame 10 in that fiber distribution frame 90 includes a diffuser component material 92. Diffuser component 92 is a malleable and cuttable material that absorbs and diffuses light (i.e., optical radiation). Diffuser component 92 attaches to the inner surface of door 14. As such, when door 14 is closed with respect to front face of housing 12, diffuser component 92 absorbs optical radiation from fiber optic components present in fiber distribution frame 10 which would otherwise escape or leak through the door.

To this end, diffuser component 92 is also attachable to the inner side surfaces of housing 12 in order to absorb optical radiation which would otherwise escape or leak through the side surfaces of the housing. At times, this is not a problem as the side surfaces of housing 12 are typically made of a light refractive/reflective material such as metal. This is more of a problem with the doors of existing fiber distribution frames as such doors may be made of a light transparent material (such as the material making sunglasses) in order to allow viewing of the contents of the fiber distribution frame. In the past, optical radiation leaking or transmitting through such light transparent doors is not a problem with such optical radiation typically having relatively low power signals. However, fiber optic components present in fiber distribution frames are more frequently emitting relatively higher optical signals. As such, placing diffuser component 92 on such light transparent doors of existing fiber distribution frames effectively prevents these high powered optical signals from inadvertently exposing human personnel.

Thus, it is apparent that there has been provided, in accordance with the present invention, a fiber distribution frame having optical security and protection features that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A fiber distribution frame comprising:
an enclosure for housing fiber optic components, the enclosure having an exposed face;
a door connected to the enclosure for opening and closing with respect to the exposed face;
a post connected to the enclosure;
a cable connected at a first end to the post; and
a latch connected to the door, the latch having a receptacle for receiving a fastener, the latch having a conduit for receiving the cable, wherein the receptacle and the conduit adjoin one another such that, when the door is closed and a second end of the cable is inserted through the conduit, a fastener fastened into the receptacle holds the cable in the conduit in order to connect the latch to the post and thereby lock the door closed.

2. The frame of claim 1 wherein:
the cable is removable from the conduit when the fastener is unfastened from the receptacle in order to disconnect the latch from the post and thereby unlock the door.

3. The frame of claim 2 further comprising:
a tool operable for fastening the fastener into the receptacle and for unfastening the fastener from the receptacle.

4. The frame of claim 3 wherein:
the fastener is a screw and the tool is a screwdriver.

5. The frame of claim 1 wherein:
the latch includes a support portion having an adhesive peel-off sticker for mounting the latch to the door.

6. The frame of claim 1 wherein:
the post includes a support portion having an adhesive peel-off sticker for mounting the post to the enclosure.

7. The frame of claim 1 wherein:
the cable is a fiber optic component.

8. The frame of claim 1 wherein:
the post further includes a ferrule crimp for connecting the first end of the cable to the post.

9. The frame of claim 1 further comprising:
a diffuser component attached to the door for absorbing radiation from fiber optic components disposed within the enclosure when the door is closed.

10. A fiber distribution frame comprising:
an enclosure for housing fiber optic components, the enclosure having an exposed face;
a door connected to the enclosure for opening and closing with respect to the exposed face;
a post connected to an exterior surface of the enclosure;
a wire having a first end, a second end, and a middle portion, wherein the first end of the wire is connected to the post; and
a latch connected to an exterior surface of the door, the latch having a conduit and a receptacle which adjoin one another;

wherein upon the door being closed with respect to the exposed face of the enclosure, the conduit receiving the second end of the wire, and the receptacle receiving a fastener, the fastener holds the second end of the wire in the conduit such that the wire is connected between the post and the latch with the middle portion of the wire securing the door from being opened.

11. The frame of claim 10 further comprising:

a diffuser component attached to the door for absorbing radiation from fiber optic components disposed within the enclosure when the door is closed.

12. The frame of claim 10 wherein:

the second end of the wire is removable from the conduit when the fastener is unfastened from the receptacle in order to disconnect the latch from the post and thereby unlock the door.

13. The frame of claim 12 further comprising:

a tool operable for fastening the fastener into the receptacle and for unfastening the fastener from the receptacle.

14. The frame of claim 13 wherein:

the fastener is a screw and the tool is a screwdriver.

15. The frame of claim 10 wherein:

the latch includes a support portion having an adhesive peel-off sticker for mounting the latch to the door.

16. The frame of claim 10 wherein:

the post includes a support portion having an adhesive peel-off sticker for mounting the post to the enclosure.

17. The frame of claim 10 wherein:

the wire is a fiber optic component.

18. A locking device for a door of a fiber distribution frame, the locking device comprising:

a post connectable to an exterior surface of the fiber distribution frame;

an element having a first end, a second end, and a middle portion, wherein the element is one of a cable and a wire, wherein the first end of the element is connected to the post;

a latch connectable to an exterior surface of the door, the latch having a conduit and a receptacle which adjoin one another;

wherein upon the door being closed with respect to the fiber distribution frame, the conduit receiving the second end of the element, and the receptacle receiving a fastener, the fastener holds the second end of the element in the conduit such that the element is connected between the post and the latch with the middle portion of the element securing the door from being opened with respect to the fiber distribution frame.

* * * * *